UNITED STATES PATENT OFFICE.

JOHN HANSON, PETER CAMERON DOUGLAS CASTLE, AND JAMES HENRY MORRISON, OF LIVERPOOL, ENGLAND.

GUM AND PROCESS OF MAKING SAME.

SPECIFICATION forming part of Letters Patent No. 531,377, dated December 25, 1894.

Application filed November 2, 1893. Serial No. 489,851. (No specimens.)

*To all whom it may concern:*

Be it known that we, JOHN HANSON, PETER CAMERON DOUGLAS CASTLE, and JAMES HENRY MORRISON, subjects of the Queen of Great Britain, residing at Liverpool, in the county of Lancaster, England, have invented certain new and useful Improvements in Gum or Mucilage, of which the following is a specification.

The object of this invention is to obtain a gum or mucilage which we call gum tragasol, which shall supersede gum tragacanth, size and other like materials in sizing or lubricating yarns for weaving cloth, putting the finish or gloss on cloth, also for use instead of other gums or size in color printing and dyeing.

To make the gum, we take the kernels or beans from the pods of the locust or carob tree (*Ceratonia siliqua*) a species of acacia. These kernels must be split in two and the inside germ got rid of. The splitting can be effected in pea or bean splitting machines and the germs got rid of by riddling and aspiration. The split kernels must now be cleaned from all foreign matter and particularly from any part of the sweet pod of the bean. This should be done without the aid of water where practicable, and can be effected by aspiration in sieves. To a hundred kilograms of the kernels or beans, we add six hundred and twenty-five kilograms of boiling water at 100° centigrade, stirring the beans in the water. We then leave them to steep for from five to six hours, some beans requiring more time than others. The mass is now lightly stirred and one hundred and twenty-five kilograms of boiling water are added. The whole now remains for another five or six hours, the temperature of the mass for the entire period being kept at about blood heat or upward. If the whole is not by this time one homogeneous mass, its state dependent much upon the temperature employed and the variety or quality of the bean, it must be again lightly stirred with agitators in the vat and left steeping until it appears to be a homogeneous mass. It is now briskly stirred with agitators and two hundred and fifty kilograms more boiling water are added during the agitation. The mass is now left to rest for from two to four hours. It is now preferably run out of the vat into another chamber in which powerful agitators rotate, and is again vigorously mixed and agitated. It is now run into a powerful hydro extractor, the one which we have used in our experiments so far being driven at about one thousand revolutions per minute. This separates the gum, which passes through the fine wire gauze of the agitator; the spent kernels being left behind but still nearly saturated with water.

This gum is used in the form in which it escapes from the hydro extractor, but it can, if desirable, be evaporated to a thick paste, but it is not found advisable to go beyond this, especially as, even in the state in which it escapes from the centrifugal machine, it sets nearly solid and it can be kept good for about ten days or more for using as size; but if it be desired to keep it sweet and of the original consistency for a much longer period of time, this can be done by adding antiseptic or other preservative compounds. We prefer, however, when it is required that the gum should be capable of being kept for a few months in this state, to vary its manufacture a little. This variation consists in steeping the split kernels for from six to seven days at blood heat or upward. By this means, the matter contained in the cuticle of the bean is extracted and is in itself a preservative. Gum made in this way has been kept sweet for over ninety days and is still good.

Another plan is by adding an antiseptic, more especially two and one-half to five per cent. of chloride of zinc solution of a strength of from 96° to 100° Twaddle. This can only be done when the gum is to be used solely for manufacturing purposes, chloride of zinc being poisonous. Except for this defect, however, it is admirable in preserving the article, and is highly antiseptic in the woven cloth.

In the foregoing, we have described the process of manufacture but not the plant. We find that this gum is liable to be acted upon by certain metals injuriously. We therefore line the vats and agitators with pure tin, and, to keep up the temperature, employ steam jackets round the vats. The agitators can, however, be of enameled iron or steel, but in no case must the gum come into direct contact with iron or steel. Otherwise it will be discolored and the iron or steel corroded. The bearings of the machinery are preferably of white metal. The cage of the hydro extractor is of enameled steel, and the outer frame is lined with tin, lead or a mixture of the two.

The gum has not the slightest trace of starch in its composition as ascertained by the iodine test. It acts well as starch or dressing for cloth and when used for this purpose either with or without additional starch, it has the property of preventing the flat iron from sticking to the cloth. It has a very corrosive action on zinc, iron, and other metals, the presence of iron in a short time turning it almost black.

This gum is of great value for sizing yarns for the weaving of cloth. It will at one operation act as a size and without the addition of tallow where the size is loaded with flour, farina, china clay or other similar substances giving elasticity and strength to the yarn and cloth. It is not sticky like rosin but has the necessary adhesiveness, and at the same time lubricates the yarn for the loom and gives a fine gloss or finish to the cloth. It is a thick solution of almost the same specific gravity as water, so much so that we have been unable to construct any hydrometer or other measuring instrument that will show the difference.

The chemical analysis of specimen of the gum as obtained direct from the hydro extractor was as follows:

| | |
|---|---|
| Oil | 0.59 per cent. |
| Albuminoid matters | 1.39 per cent. |
| Mucilage, gum, &c. | 0.93 per cent. |
| Woody fiber | Trace. |
| Ash | 0.14 per cent. |
| Moisture | 96.95 per cent. |
| | 100.00 per cent. |

The albuminoid matters above mentioned contain .22 per cent. of nitrogen.

It will be seen from the foregoing that where the gum has to be used soon after it is made, the extractive matter of the cotyledons alone is used, whereas if it be kept for some time, the extractive matter of the cuticle is also added to the gum; further, that it is only the cotyledon and the cuticle that must be employed as we have found that the sweet matter of the pod and the extractive matter of the germs have a very deleterious and fermentive action on the gum.

We declare that what we claim is—

1. As a new article of manufacture, a gum comprising the soluble matter of the cotyledons of the beans of the locust tree, and water in substantially the proportion set forth,—said gum being characterized as being of the almost exact specific gravity of water, as containing no starch, and as acting strongly upon iron and zinc, the presence of iron turning the gum nearly black and the said gum forming a somewhat stiff jelly when containing about ninety-six per cent. of water and having the useful qualities herein set forth.

2. As a new article of manufacture the combination of the gummy extract of the split cotyledons of the locust beans with the extract of the cuticle of the same, the said gum having strong keeping qualities.

3. The process of manufacturing gummy matter from the beans or kernels of the locust tree, which consists in breaking the kernels; separating the cotyledons from the germs and steeping the former in warm water for long periods, as described; and separating the solution from the insoluble residue.

4. In the process of manufacturing gummy matter from the beans or kernels of the locust tree steeping the split kernels in water, keeping it about blood heat for many hours and agitating until the kernels become an apparently homogeneous mass and separating the gummy solution from the solid matter by centrifugal action.

5. In the process of manufacturing gummy matter from the beans or kernels of the locust tree, steeping the broken kernels and cuticle in water above blood heat until the extractive matter from the cuticle has become dissolved whereby an antiseptic matter is added to the gum produced from the kernels.

6. In the process of manufacturing gummy matter from the beans or kernels of the locust tree, splitting the kernels; separating the cotyledons from the germs; and dissolving out the soluble matters from the cotyledons.

In testimony whereof we have signed our names to this specification in the presence of two subscribing witnesses.

JOHN HANSON.
PETER CAMERON DOUGLAS CASTLE.
JAMES HENRY MORRISON.

Witnesses:
JOHN MCLACHLAN,
EDWARD ERNEST WHITE.